United States Patent [19]

Jones et al.

[11] Patent Number: 4,891,971
[45] Date of Patent: Jan. 9, 1990

[54] ENGINE MONITORING APPARATUS

[75] Inventors: John W. D. Jones, Nympsfield; Peter F. O'Sullivan, Cheltenham, both of England

[73] Assignee: Smiths PLC, London, England

[21] Appl. No.: 287,238

[22] Filed: Dec. 21, 1988

[30] Foreign Application Priority Data

Dec. 23, 1987 [GB] United Kingdom ............... 8729962

[51] Int. Cl.$^4$ ............................................ G01M 15/00
[52] U.S. Cl. ................................. 73/117.3; 340/959; 364/431.1
[58] Field of Search ................ 73/116, 117.3, 117.2; 340/945, 959, 132; 364/431.01, 431.1, 431.02

[56] References Cited

U.S. PATENT DOCUMENTS

| | | | |
|---|---|---|---|
| 3,713,090 | 1/1973 | Dickinson | 340/945 |
| 4,350,008 | 9/1982 | Zickwolf, Jr. | 60/39.14 R |
| 4,635,030 | 1/1987 | Rauch | 340/945 |

FOREIGN PATENT DOCUMENTS 1524796  9/1978  United Kingdom .

Primary Examiner—Jerry W. Myracle
Attorney, Agent, or Firm—Pollock, Vande Sande & Priddy

[57] ABSTRACT

Abnormal start conditions, such as hot starts or hung starts, in an aircraft gas-turbine engine are monitored by deriving signals indicative of spool speed, engine temperature and fuel flow. A processor receives these signals and derives an indication of the rate of change of engine temperature. Signals indicative of whether the aircraft is on the ground or in the air are derived from a air speed sensor or undercarriage pressure switch. The processor monitors the relationship between these signals to determine when the relationship between them is indicative of an abnormal start condition and indicates this on a display such as by flashing the display of engine temperature.

11 Claims, 2 Drawing Sheets

ENGINE MONITORING APPARATUS

BACKGROUND OF THE INVENTION

This invention relates to engine monitoring apparatus.

The invention is more particularly concerned with apparatus for detecting abnormal start conditions of a gas-turbine engine.

During start-up procedures of a gas-turbine engine, the pilot or flight engineer (where the engine is in an aircraft) monitors a number of instruments giving details of various engine characteristics, such as N 1 and N 2 spool speeds, exhaust gas temperature EGT, and fuel flow. It is important for the engine operation to be carefully monitored during start-up because gas-turbine engines can be prone to abnormal or 'hot' starts which can lead to irreparable damage to an engine at a cost of up to about one million pounds. Some aircraft operators experience several such hot starts each year.

It will be appreciated that, at the time of starting the engine, the flight crew are faced with many other tasks as well as monitoring for hot starts. With some engines it can take up to a minute for the engine to start and for the risk of hot start to be passed. The detection of hot start relies on the flight crew's ability accurately to assess the instrument readings, to remember the various limits of operation that may be indicative of a hot start and to identify exceedance of these limits and take appropriate action. The flight crew's ability to do this while undertaking other activities can be restricted.

BRIEF SUMMARY OF THE INVENTION

It is an object of the present invention to provide engine monitoring apparatus and methods that can be used to detect abnormal start conditions in gas-turbine engines.

According to one aspect of the present invention there is provided engine monitoring apparatus for detecting abnormal start conditions of a gas-turbine engine including means for deriving a first signal indicative of spool speed, means for deriving a second signal indicative of engine temperature, processing means arranged to received the first and second signals, the processing means being arranged to monitor the dynamic relationship between the first and second signals such as to determine when the said relationship is indicative of an abnormal start condition, and means for signalling in real time an indication of such abnormal start condition.

The apparatus may include means for deriving a third signal indicative of fuel flow. The apparatus may include means for providing a visual display of spool speed and engine temperature. The means for signalling abnormal start condition preferably includes visual display means. Abnormal start condition may be signalled by flashing the visual display such as the visual display of engine temperature. The processing unit may be arranged to derive an indication of the rate of change of engine temperature.

Where the apparatus is for an aircraft engine, the apparatus may include means for providing a fourth signal indicative of whether the aircraft is on the ground or in the air, the processing means being arranged to receive the fourth signal and to utilise the fourth signal in determining when the relationship is indicative of abnormal start conditions.

The means for providing the fourth signal may include air speed sensor means, and or alternatively, means for sensing pressure on the aircraft undercarriage.

In this way, the user of the engine can be alerted to a possible abnormal start condition, enabling him to take remedial action, with a reduced risk of such an abnormal start condition being overlooked.

Monitoring apparatus for an aircraft gas turbine-engine, and its method of operation, in accordance with the present invention, will now be described, by way of example, with reference to the accompanying drawings.

DETAILED DESCRIPTION

Figure 1:
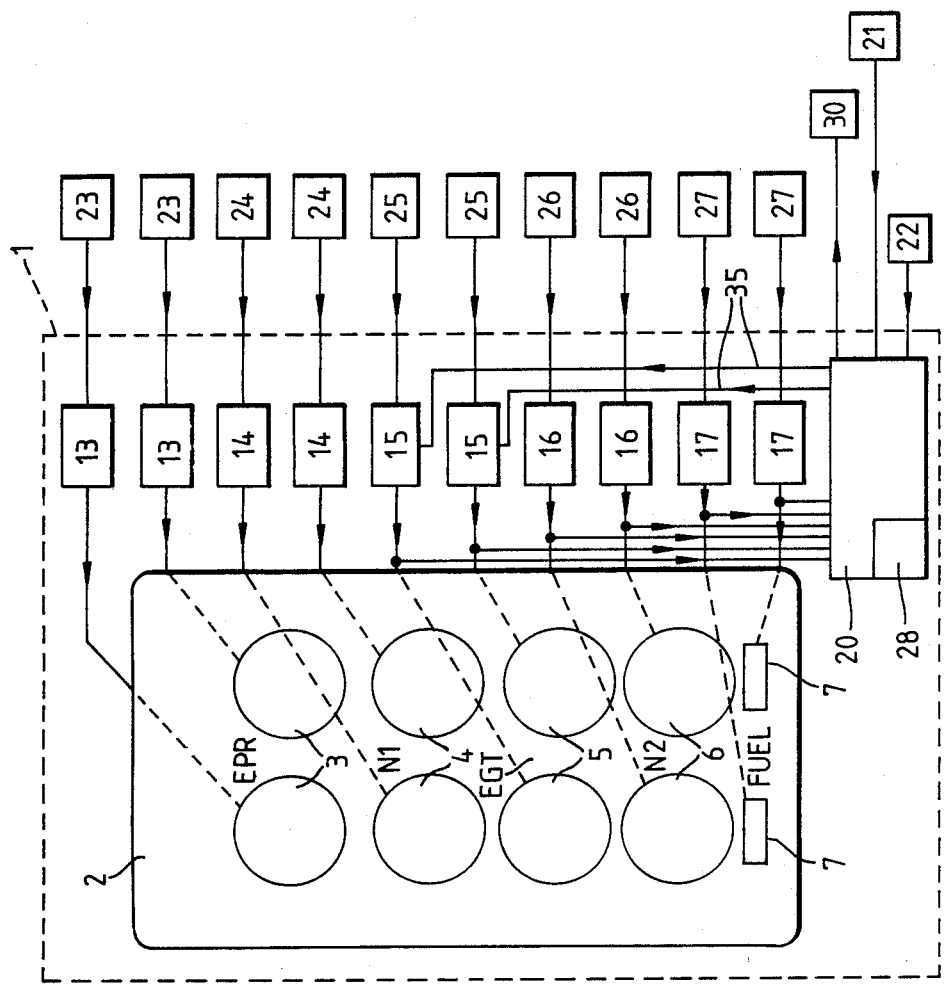
FIG. 1 shows the apparatus schematically.

With reference to FIG. 1, the monitoring apparatus is included within an otherwise conventional engine display system, indicated generally by the numeral 1. The system 1 has a front display panel 2 with various light-emitting diode display regions 3 to 7 on which are displayed respectively engine pressure ratio EPR, spool speed N 1, engine exhaust gas temperature EGT, spool speed N 2 and fuel flow. Each of the display regions 3 to 7 is duplicated on the panel 2 in order to enable information about two gas-turbine engines to be displayed side-by-side.

Each of the display regions 3 to 7 is driven by respective driver units 13 to 17 which receive inputs from respective sensors 23 to 27 associated with each engine and process the sensor outputs into a suitable form for driving the display regions.

The outputs from the driver units 15 to 17 providing the EGT, N2 and fuel flow information are also supplied to a processing unit 20. The processing unit 20 also receives input signals from an outside air temperature detector 21 and from a flight/ground detector 22 (this may, for example, be an undercarriage pressure switch or an airspeed detector).

The processing unit 20 includes a memory store 28 in which is stored a model of the normal relationship between temperature EGT and spool speed N 2 at different fuel flows and outside air temperatures. Different models may be employed according to whether the engine is on the ground or in the air, this being indicated by the output of the detector 22.

The processing unit 20 monitors the dynamic relationship between engine temperature EGT, fuel fuel and spool speed N 2, comparing this against the model stored in the store 23. In particular, the processing unit 20 derives a signal representing the rate of change of engine temperature. Generally, the temperature tracks turbine speed, an increase in EGT being accompanied by an increase in N 2. If the processing unit 20 detects that these operational conditions fall outside those of the stored model, it signals this in real time to the flight crew by supplying a signal on line 35 to the appropriate EGT display driver 15, according to the engine that is malfunctioning, to cause the display region 5 to flash. It is also possible to supply a signal to a separate alarm 30, such as an audible alarm or an indicator on a separate anunciator panel. The flashing of the display region 5 causes it to become conspicuous to the flight crew, even if the display panel is not viewed directly because, in the parafoveal region of the eye a changing image is more readily noticeable.

Figure 2:
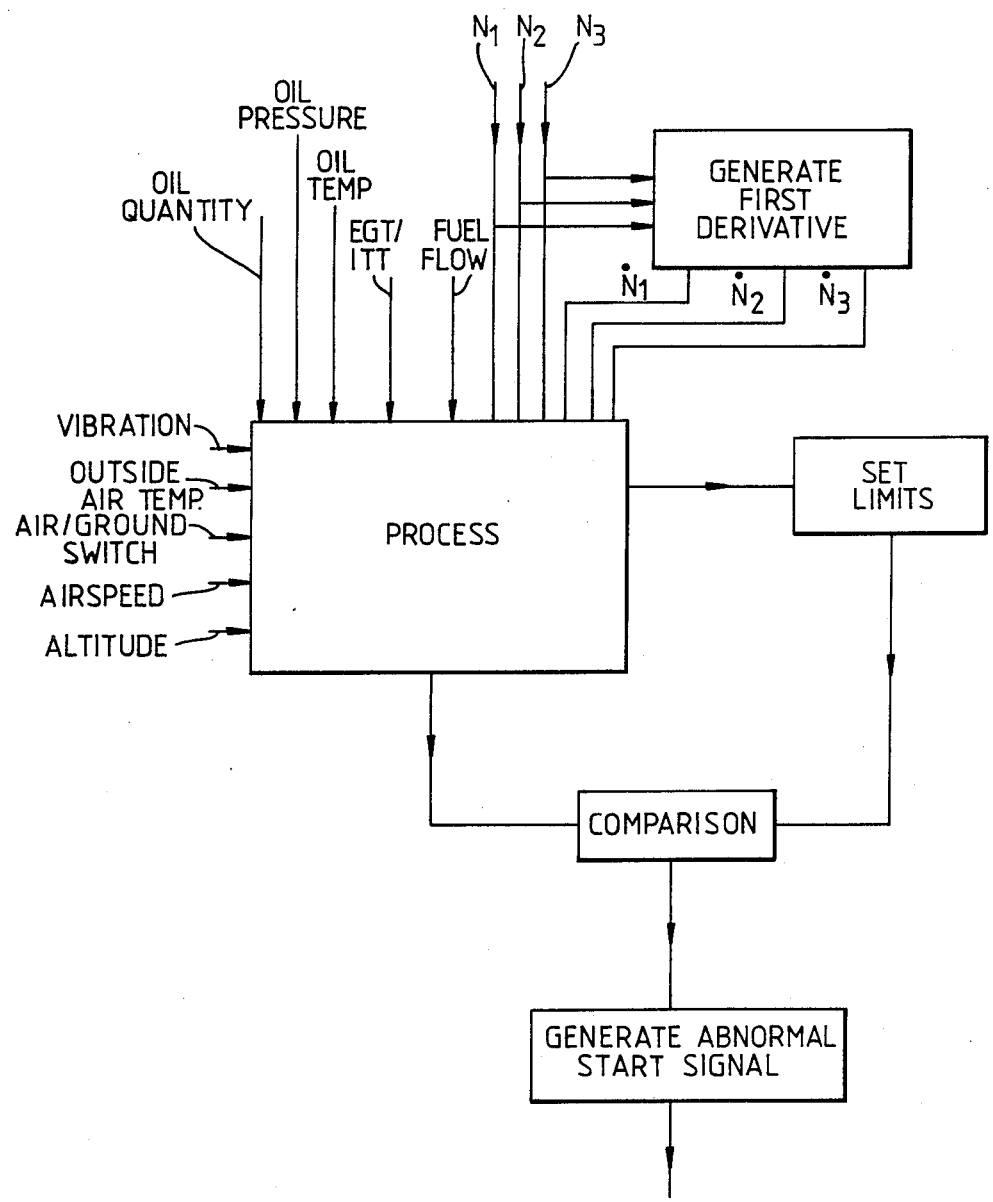
FIG. 2 is a flow chart illustrating operation of the apparatus.

With reference to FIG. 2, there is illustrated steps in the operation of the processing unit 20. The algorithm used in the PROCESS step is unique to each type of engine and can be provided the engine manufacturer. In general it will be necessary to generate first derivatives of the spool speeds N1, N2, N3 although derivatives of other engine or aircraft parameters may be needed for some algorithms. Examples of parameters utilised in the algorithm are shown as FUEL FLOW, EGT/ITT (inter turbine temperature), OIL TEMPERATURE, OIL PRESSURE, OIL QUANTITY, N1, N2, N3, $\dot{N}1$, $\dot{N}2$ and $\dot{N}3$. It may not be necessary to use all of these parameters, or additional parameters may be needed for other algorithms. Limits are set according both to predetermined absolute levels and to levels determined by the PROCESS step. One or more COMPARISON steps are performed and if the limits are exceeded, an abnormal start signal is generated.

It is generally considered undesirable to interrupt flow of fuel automatically in aircraft applications where engine shut-down can be dangerous.

An abnormal start condition is one which eventually increases the probability of damage or distress to the engine. In some circumstances, abnormal start conditions can occur but the engine continues to start. This may not lead to immediate failure of the engine but can lead to increased fatigue and thereby reduce its safe operating life. The apparatus of the present invention enables abnormal start conditions to be detected at an early stage, before damage or distress is caused to the engine.

In addition to the detection of 'hot starts' the processing unit 20 can be arranged to detect other abnormal start conditions, such as a 'hung start'. Because different engines operate in different ways the monitoring apparatus may function in different ways, although, in general the processing unit will need to receive inputs indicative of engine temperature, fuel flow and spool speed.

The processing unit 20 need not be a separate unit but could, for example, be provided by a part of the processing capability of one or more of the display driver units 13 to 17. The display driver units 13 to 17 themselves could be provided by a single unit with a multiplexed output.

What is claimed is:

1. Engine monitoring apparatus for detecting abnormal start conditions of a gas-turbine engine comprising: means for deriving a first signal indicative of spool speed; means for deriving a second signal indicative of engine temperature ; processing means arranged to receive the first and second signals, said processing means monitoring the dynamic relationship between the first and second signals such as to determine when the said relationship is indicative of an abnormal start condition ; and visual display means which signals in real time a visual indication of such an abnormal start condition.

2. Engine monitoring apparatus according to claim 1, including means for deriving a third signal indicative of fuel flow.

3. Engine monitoring apparatus according to claim 1 wherein the said visual display means provides a visual display of spool speed and engine temperature.

4. Engine monitoring apparatus according to claim 1, wherein the visual display means signals abnormal start condition by flashing the visual display.

5. Engine monitoring apparatus according to claim 4, wherein the visual display means signals abnormal start condition by flashing the visual display of engine temperature.

6. Engine monitoring apparatus according to claim 1, wherein the processing unit is arranged to derive an indication of the rate of change of engine temperature and wherein the processing means is arranged to utilize the rate of change of engine temperature in determining when said relationship is indicative of abnormal start conditions.

7. Engine monitoring apparatus for an aircraft engine according to claim 1 including means for providing a fourth signal indicative of whether the aircraft is on the ground or in the air, and wherein the processing means is arranged to receive the fourth signal and to utilize the fourth signal in determining when said relationship is indicative of abnormal start conditions.

8. Engine monitoring apparatus according to claim 7, wherein said means for providing a fourth signal includes air speed sensor means.

9. Engine monitoring apparatus according to claim 7, wherein the said means for providing a fourth signal includes means for sensing pressure on the aircraft undercarriage.

10. Engine monitoring apparatus for detecting abnormal start conditions of a gas-turbine engine comprising: means for deriving a first signal indicative of spool speed; means for deriving a second signal indicative of engine temperature; means for deriving a third signal indicative of fuel flow; processing means arranged to receive the first, second and third signals, said processing means monitoring the relationship between the first, second and third signals such as to determine when the said relationship is indicative of an abnormal start condition; visual display means; means for supplying the first, second and third signals to the visual display means such that the visual display means provides a display of spool speed, engine temperature and fuel flow; and means for signalling in real time to the visual display means an indication of said abnormal start condition such that the visual display means provides a visual display of said abnormal start condition.

11. Engine monitoring apparatus for detecting abnormal start conditions of a gas-turbine engine comprising: means for deriving a signal indicative of fuel flow; processing means arranged to monitor said signal dynamically in time to determine when an abnormal start condition is indicated; and visual display means which signals in real time a visual indication of such an abnormal start condition.

* * * * *

UNITED STATES PATENT AND TRADEMARK OFFICE
CERTIFICATE OF CORRECTION

PATENT NO.   :   4,891,971
DATED        :   January 9, 1990
INVENTOR(S)  :   John W. D. Jones et al It is certified that error appears in the above-identified patent and that said Letters Patent is hereby corrected as shown below:

ON TITLE PAGE: of the patent, please change

"[73]  Assignee:  Smiths PLC" to:

--[73]  Assignee:  Smiths Industries Public Limited Company--.

Signed and Sealed this

Twenty-eighth Day of January, 1992

Attest:

HARRY F. MANBECK, JR.

*Attesting Officer*   *Commissioner of Patents and Trademarks*